United States Patent [19]

Santiago

[11] 4,231,911
[45] Nov. 4, 1980

[54] ABRASION RESISTANT COATING FOR FOAMED PLASTIC SUBSTRATES

[75] Inventor: Edgardo Santiago, Toledo, Ohio

[73] Assignee: Owens-Illinois, Inc., Toledo, Ohio

[21] Appl. No.: 33,279

[22] Filed: Apr. 25, 1979

Related U.S. Application Data

[63] Continuation of Ser. No. 926,189, Jul. 20, 1978, abandoned.

[51] Int. Cl.$^3$ ............................................... C08L 75/04
[52] U.S. Cl. ........................... 260/29.6 NR; 428/315; 428/423.3; 428/424.8
[58] Field of Search ............... 260/29.2 TN, 29.6 NR, 260/29.6 ME, 29.6 XA, 859 R

[56] References Cited

U.S. PATENT DOCUMENTS

| | | | |
|---|---|---|---|
| 3,380,945 | 4/1968 | Deex | 260/29.6 XA |
| 3,461,103 | 8/1969 | Keberle | 260/859 R |
| 4,018,737 | 4/1977 | Teer | 260/29.6 ME |

*Primary Examiner*—Paul R. Michl
*Attorney, Agent, or Firm*—E. J. Holler; M. E. Click; D. H. Wilson

[57] ABSTRACT

A protective coating composition is applied to the decorated and/or printed surface of a foamed plastic substrate to provide abrasion resistance, high gloss, and lubricity. Preferably, the composition is comprised of a water-based mixture of polyurethane resin and emulsified polyethylene resin, the latter being emulsified with an ionic or non-ionic emulsifier. The composition is especially useful for application over the exterior of foamed plastic surfaces which have been decorated and/or printed with printing inks prior to fabrication of the material into plastic articles.

6 Claims, No Drawings

ABRASION RESISTANT COATING FOR FOAMED PLASTIC SUBSTRATES

This is a continuation of application Ser. No. 926,189 filed July 20, 1978 now abandoned.

BACKGROUND OF THE INVENTION

1. Field of the Invention

This invention relates to protecting foamed plastic materials from damage due to abrasion and impact, and more particularly to providing abrasion resistance, high gloss and lubricity to decorated and/or printed foamed plastic articles.

Plastic articles such as disposable cups, bowls and labels, particularly those made from foamed thermoplastic resins such as polystyrene and the like, are widely used because of their thermal resistance to hot and cold beverages, high strength to weight ratios, and economics. Also, such materials are extensively used in the packaging industry for labeling containers such as glass bottles and jars where individual partitions may be eliminated on shipping. In many of the above applications, the exterior surfaces of the foamed plastic material are decorated and/or printed, and must be able to withstand considerable surface-to-surface abrasion without scuffing, marring or other objectionable damage. Also, such surfaces must provide suitable lubricity to allow sliding contact with each other, as well as the surfaces of filling and capping equipment on further handling of the containers. The inherent nature of the foamed plastic material varies due to its cellular structure, and especially when the material is oriented to be heat-shrunk in place on containers or fabrication mandrels. The cells tend to open or weaken which leaves the base material particularly susceptible to abrasion damage.

Foamed plastic articles, made from thermoplastic resins which are fabricated into cups, bowls and labels, are frequently relatively rigid or semi-rigid and, therefore, tend to abrade when subjected to even moderate sliding contact. In most of the above applications, the exterior surfaces of the articles are decorated or printed with desired advertising images or informational messages while in the form of roll stock from which suitable blanks are made. When the articles are fabricated into cups or bowls, or tubular sleeves to be used as labels on glass bottles or jars, the exterior surfaces must be capable of withstanding both impact and abrasion forces without damage. In instances where the materials are used as labels, and also serve as partitions between containers where long shipments are required, the labels can and do exhibit serious scuffing and abrasion damage to the decorative or printed images, thus detracting from their marketability.

2. Description of Prior Art

Many of the most common uses of foamed plastic material as stated have not employed a protective overcoat for the plastic substrate and thus have incurred deleterious surface damage, especially where long shipments of containers are required. The existing types of clear, transparent coatings are either too expensive or too limited in their properties for widespread commercial use. The commercially available materials are generally organic-solvent based which tend to contaminate the atmosphere on drying. Further, they do not provide abrasion resistance for long distance shipping of such containers.

SUMMARY OF THE INVENTION

Accordingly, it is an object of the invention to provide a lubricious wear-resistant coating for plastic surfaces.

Another object of this invention is specifically concerned with providing a water-based coating composition which can be applied to foamed thermoplastic materials by conventional printing techniques and equipment without need for special drying or emission-control precautions.

Another object of this invention is to provide a coating composition for increasing the abrasion-resistance properties of a plastic surface while providing most economical per unit area coverage.

Another object of the present invention is to provide a composition for forming an abrasion-resistant coating on plastic surfaces while avoiding the shortcomings of solvent-based compositions known and used in the past in attempting to form such abrasion-resistant coatings.

A further object of this invention is to provide a thin, substantially-transparent coating on a plastic surface, which coating is highly resistant to abrasion and enhances the physical appearance of the surface, while simultaneously substantially maintaining the strength characteristics of the plastic.

A still further object of this invention is to provide a coating for foamed plastic substrates, such as the exterior surface of a label for glass containers, so as to impart thereto improved dry and wet scratch-resisting properties, thus permitting the labeled container to undergo normal handling, processing and shipping conditions with consequent rubbing of the label surface with like and unlike surfaces unaffecting the appearance or mechanical properties of the label or container.

Yet another object of this invention is to provide an article of manufacture having a foamed plastic substrate with a surface having a tightly-adhering, thin, substantially-colorless and transparent coating, which coating imparts superior wet and dry scratch-resisting and abrasion-resisting properties to the plastic surface. Plastic ware and labels thus have a thin, substantially-colorless and transparent coating on their exterior surfaces, which coating is unsoluble in water, is free from taste or odor, and is non-toxic so as to permit the ware and labels to be safely used on the exterior surfaces of containers for food and beverages. Thus, the coating is unobjectionable since it does not ordinarily come into direct contact with the contained comestible or foodstuff.

Briefly stated, this invention provides a protective coating for foamed plastic articles, and especially those which are comprised of foamed polystyrene, foamed polyethylene and the like, and fabricated from rolls of plastic stock. The coating is comprised of an aqueous mixture of polyurethane resin and polyethylene resin, which polyethylene resin is emulsified with a non-ionic or anionic emulsifier. The preferred polyurethane resin consists of an aliphatic water-dispersed resin and the polyethylene resin consists of low to medium-low molecular weight non-ionically water-emulsified resin. The polyurethane resin and polyethylene resin preferably have a solids ratio ranging from 1:9 to 1:1, with the most desirable solids ratio being 1:1. The preferred non-ionic emulsifying agent for the polyethylene resin consists of nonylphenoy poly (ethyleneoxy) ethanol and the preferred anionic emulsifying agent consists of morpholine oleate, potassium oleate, or sodium oleate. The composition has a preferred viscosity ranging from about 18 to 35 seconds as measured by Zahn Cup No. 2 at 65° to 85° F. to permit wide useage of the water-based composition as a colorless overcoating printing ink in various basic printing methods.

DESCRIPTION OF THE PREFERRED EMBODIMENT

An especially-desirable component for preparing the subject composition consists of an oxidized homopolymer of polyethylene resin and preferably Allied Chemical Polyethylene—Product No. AC-316—having a softening point of 140° C. (284° F.) (ASTM E-28), a hardness (dmm) of less than 0.5 (ASTM D-5), a density (g/cc) of 0.98 (ASTM D-1505), a viscosity (cps) at 149° C. (300° F.) (Brookfield) of 30,000, and an acid number (mgKOH/g) of 16. The subject material is Food and Drug Administration approved for use in connection with packaging products. Also, Allied Chemical Polyethylene—Product No. AC-392—which is equivalent to AC-316 may be used for the stated purposes, both materials manufactured and sold by Allied Chemical Corporation.

The basic formulation for the AC-316 Product of the polyethylene emulsion non-ionic type is as follows:

|  | PBW |
|---|---|
| AC Polyethylene 316 | 40.0 |
| GAF Igepal CO-630 | 10.0 |
| KOH 90% Flake | 1.0 |
| $Na_2S_2O_5$ | 0.4 |
| Water to 30% Solids | 120.0 |

The preferred polyurethane resin is Neorez R-960 which is an aqueous colloidal dispersion of an aliphatic urethane manufactured and sold by Polyvinyl Chemical Industries. This product has wet properties of solids 34±1, ph of 7.5 to 8.5, viscosity (cps) of 400 to 800, density (lbs/gal) of 8.8, excellent mechanical stability, and will pass 5 cycles in its freeze-thaw stability. This product also has the following performance properties:

| CURE SCHEDULE | |
|---|---|
| Air Dry | 6 hrs |
| Force Dry | 10 min @ 200° F. |
| Hardness | 4 H |
| Tensil Strength | 5000 psi |
| Cure 10 min @ 200° F. | |
| Taber Abrasion | 28 mg loss |
| Chemical Resistance | Excellent |

As a non-ionic emulsifier, a preferred material is GAF Igepal No. CO-630, which is a surfactant with a mole ratio of 9 units of ethylene oxide, which units provide 65% of the ethylene oxide contained therein. This material is a polyoxyethylated nonylphenol—more particularly nonylphenoxypoly (ethyleneoxy) ethanol. Such surfactant has a non-ionic character making it useful with either anionic or cationic agents.

Various other non-ionic type emulsifiers can be used such as GAF Igepal CO-610 and CO-710, both of which are generally similar to Product CO-630. Among the various types of anionic emulsifiers which can be used are morpholine oleate, potassium oleate, and sodium oleate.

A low molecular weight alcohol is normally used in the composition to provide three distinct advantages.

The alcohol is readily compatible with the emissible from the water-based composition in all proportions. The alcohol provides: (a) long term shelf stability for the composition, (b) printability or lubricity to the system so that it can be flexographically printable, and (c) a depressant of the surface tension and/or coefficient of friction of the system so that it can be more easily printable.

The surface tension of the composition can be further depressed by addition of small amounts of water-miscible silicone fluids. Products such as LE-45 and L-77, which are silicone fluids made and sold by Union Carbide Corporation, can be added to impart higher lubricity to the system, and also serve as a surface tension depressant. It is preferred to add small amounts of silicone fluid, an addition of LE-45 in the amount of less than 1 percent by weight based on the entire system being particularly desirable.

If desired, an ultraviolet tracer can be added to the system, as is conventionally known in the art, so that it can be determined where the material has been printed or applied. This is especially important where the system is basically colorless and transparent, and used in thin film applications.

EXAMPLE I

In preparing a limited quantity of the subject coating composition, such as approximately one gallon, the following constituents are taken by weight and intermixed as set forth hereinbelow:

| COMPONENT | MATERIAL | AMOUNT (by weight) |
|---|---|---|
| A | Polyethylene Resin (AC-316) | 1660.00 gm |
| B | Polyurethane Resin (R-960) | 1470.00 gm |
| C | Water | 700.00 gm |
| D | Isopropanol | 767.50 gm |
| E | Silicone Fluid (LE-45) | 7.60 gm |
| F | Silicone Fluid (L-77) | 0.23 gm |
| | TOTAL | 3605.33 gm |

With regard to the listed constituents, the following information provides more detailed specifications of the percent by weight of solids content of the preferred commercial materials as supplied:

| COMPONENT | PERCENT SOLIDS | NATURE |
|---|---|---|
| A | 30.0 | Water Emulsion |
| B | 33.3 | Water Dispersion |
| E | 30.0 | Water Emulsion |
| F | 100.0 | — |

Components E and F are both optional for use in improving lubricity and/or reducing the surface tension of the final product depending upon the selected printing process for applying the coating. Where the printing process consists of the flexographic method, these optional constituents are valuable additions to achieve best results where only prescribed surface areas of roll stock are to be overcoated and other areas are to be left uncoated.

The preferred procedure for mixing the aforesaid constituents with continuous stirring consists of taking the polyurethane resin (b) and mixing it with the water fraction (c). The latter mixture then is added to the aqueous polyethylene emulsion (a) as the stirring is continued. The low molecular weight alcohol and preferably isopropanol (D) is then added to the mixture with stirring. The optional silicone fluids, components E and/or F, are then added to the mixture with further continuous stirring. Component E is added on the basis of 0.2 percent by weight of the mixture of components A through D. Component F is added on the basis of 0.005 percent by weight of the mixture of components A through D.

Component E consists of a Union Carbide silicone emulsion designed for use in a wide variety of release and lubricant applications. Such materials are dimethylpolysiloxanes having low surface tension and excellent lubricity for use in the manufacture of printing inks. They serve to facilitate pigment dispersion, impart slip to the ink to improve performance, and assist the printing process by minimizing ink buildup. Component E is a very stable emulsion for addition to printing inks to decrease ink smearing and set-off. The addition of Component E to the aqueous ink system which is also water-dilutable improves flow and leveling properties of the composition.

The polyurethane resin and polyethylene resin are present in a solids ratio ranging from 1:9 to 1:1, the preferred ratio being about 1:1. The composition also includes a low molecular weight alcohol as a printing additive ranging from 0 to 30 percent by weight, based upon the three primary constituents of polyethylene, polyurethane and water, with isopropyl alcohol being preferred.

The subject composition is particularly valuable for coating foamed plastic substrates such as foamed polystyrene, foamed polyethylene, foamed polypropylene, and foamed polyurethane which has been formed into continuous sheet ranging from 0.002 to 0.030 inch thickness, for example. The surface of the newly-formed sheet is usually treated by corona discharge or other means to make it polar in nature. After the sheet in the form of roll stock is printed and decorated as desired with normally from 2 to 4 colors of decorating inks, the coating composition is applied as a thin film over the previously-printed areas, normally as a film having 0.1 to 5 mil thickness (0.0001 to 0.005 inch). The coating is colorless and provides high-abrasion resistance to the decorated substrate, plus high gloss and lubricity. Where the coating is applied over conventional printing inks, no further pre-treatment of the substrate is required. However, where the coating is applied over undecorated or unprinted surfaces, the substrate must be made polar, as is well understood in the art. The coating is heated following its application to dry the coating and remove the water component primarily by evaporation.

Long distance shipment tests of the coated materials in label form have indicated the value of the coating. Little or no scuffing or marring of the substrates has been found to occur, even where the labels have been in direct physical sliding contact for long periods without intermediate partitions between containers. The coating does not exhibit any sticking and being water-based, lends itself to many different types of printing processes. It provides greater coverage of surfaces per unit weight or volume than solvent-based systems, and is especially economical for extended use.

Tests of subject coating composition have shown improved scuff resistance which permits case shipping of labeled bottles and jars without partitions or pads. The composition has shown consistently high gloss and excellent abrasion resistance as measured by carton vibration tests and rub tests on filled and capped containers. Lubricity is determined by slide angle and coefficient of friction tests which indicate the filled containers have fully acceptable lubricious surfaces. Also, no color density change of printing or decorating inks is observable from application of the overcoat.

Various modifications may be resorted to within the spirit and scope of the appended claims.

I claim:

1. A synthetic varnish composition adapted to be applied by conventional printing techniques and equipment to films of foamed plastic substrates to provide an adherent, lubricious, abrasion resistant, protective coating thereon, said composition comprising an emulsified aqueous mixture of polyurethane resin and polyethylene resin having a solids ratio ranging from 1:9 to 1:1, said polyethylene resin being emulsified with a non-ionic or anionic emulsifying agent, and up to 30% by weight of a low molecular weight alcohol, the amount of said alcohol being sufficient to depress the surface tension and coefficient of friction of said composition to improve printability and lubricity thereof and provide long-term shelf stability to said composition, the viscosity of said composition ranging from about 18 to 35 seconds as measured by Zahn Cup No. 2 at 65° to 85° F.

2. A synthetic varnish composition adapted to be applied by conventional printing techniques and equipment to films of foamed plastic substrates to provide an adherent, lubricious, abrasion resistant, protective coating thereon, said composition consisting essentially of an emulsified aqueous mixture of polyurethane resin and polyethylene resin having a solids ratio of about 1:1, said polyethylene resin being emulsified with a non-ionic emulsifying agent consisting essentially of nonylphenoxy poly(ethyleneoxy)ethanol, and up to 30% by weight of isopropyl alcohol, the amount of said isopropyl alcohol being sufficient to depress the surface tension and coefficient of friction of said composition to improve printability and lubricity thereof and provide long-term shelf stability to said composition, the viscosity of said composition ranging from about 18 to 35 seconds as measured by Zahn Cup No. 2 at 65° to 85° F.

3. The synthetic varnish composition for the protective coating of foamed plastic substrates in accordance with claim 1, wherein said polyurethane resin and polyethylene resin have a solids ratio of about 1:1.

4. The synthetic varnish composition for the protective coating of foamed plastic substrates in accordance with claim 1, wherein said non-ionic emulsifying agent consists of nonylphenoxy poly(ethyleneoxy)ethanol.

5. The synthetic varnish composition for the protective coating of foamed plastic substrates in accordance with claim 1, wherein said anionic emulsifying agent is selected from the group consisting of morpholine oleate, potassium oleate, and sodium oleate.

6. The synthetic varnish composition for the protective coating of foamed plastic substrates in accordance with claim 1, wherein said composition includes up to 30 weight percent isopropyl alochol as a printing additive.

* * * * *